(12) United States Patent
Di Mattia

(10) Patent No.: US 12,375,527 B2
(45) Date of Patent: Jul. 29, 2025

(54) LEVERAGING NETWORK SECURITY SCANNING TO OBTAIN ENHANCED INFORMATION REGARDING AN ATTACK CHAIN INVOLVING A DECOY FILE

(71) Applicant: Fortinet, Inc., Sunnyvale, CA (US)

(72) Inventor: Aldo Di Mattia, Rome (IT)

(73) Assignee: Fortinet, Inc., Sunnyvale, CA (US)

( * ) Notice: Subject to any disclaimer, the term of this patent is extended or adjusted under 35 U.S.C. 154(b) by 287 days.

(21) Appl. No.: 16/910,511

(22) Filed: Jun. 24, 2020

(65) Prior Publication Data
US 2021/0409446 A1    Dec. 30, 2021

(51) Int. Cl.
*H04L 9/40* (2022.01)

(52) U.S. Cl.
CPC ...... *H04L 63/1491* (2013.01); *H04L 63/1408* (2013.01); *H04L 63/1425* (2013.01); *H04L 2463/146* (2013.01)

(58) Field of Classification Search
CPC ............. H04L 63/1408; H04L 63/1425; H04L 63/1491; H04L 2463/146
See application file for complete search history.

(56) References Cited

U.S. PATENT DOCUMENTS

| | | | | |
|---|---|---|---|---|
| 8,549,643 B1 * | 10/2013 | Shou | ..................... | G06F 21/556 455/410 |
| 9,009,829 B2 * | 4/2015 | Stolfo | ................... | G06F 21/552 726/23 |
| 9,043,905 B1 * | 5/2015 | Allen | ...................... | H04L 63/20 726/22 |
| 9,553,886 B2 * | 1/2017 | Touboul | .................. | G06F 21/55 |
| 9,747,455 B1 * | 8/2017 | McClintock | ........ | H04L 63/1441 |
| 9,942,253 B2 * | 4/2018 | Freedman | ......... | G06F 16/24565 |
| 9,985,988 B2 * | 5/2018 | Gukal | ................... | H04L 63/145 |
| 9,992,225 B2 * | 6/2018 | Kolton | ................ | H04L 63/1491 |
| 10,084,817 B2 * | 9/2018 | Saher | .................... | G06F 16/951 |
| 10,178,109 B1 * | 1/2019 | Miskovic | ............ | H04L 63/1416 |
| 10,404,747 B1 * | 9/2019 | Sela | ..................... | H04L 63/1408 |
| 10,595,215 B2 * | 3/2020 | Li | ............................ | H04L 63/08 |

(Continued)

OTHER PUBLICATIONS

Fortinet Technologies Inc., FortiDeceptor Administration Guide Version 3.0.1, dated Feb. 14, 2020, 50 pages.

*Primary Examiner* — David Garcia Cervetti
(74) *Attorney, Agent, or Firm* — Law Office of Dorian Cartwright; Dorian Cartwright

(57) ABSTRACT

Systems and methods for identifying a source of an attack chain based on network security scanning events triggered by movement of a decoy file are provided. A decoy file is stored on a deception host deployed by a deception-based intrusion detection system (IDS) within a private network. The decoy file contains therein a traceable object that is detectable by network security scanning performed by multiple network security devices protecting the private network. Information regarding an attack chain associated with an access to the decoy file or a transmission of the decoy file through the one or more network security devices is received by the deception-based IDS from the one or more network security devices. The information is created responsive to detection of a security incident by the network security scanning. Finally, an Internet Protocol (IP) address of a computer system that originated the attack chain is determined.

20 Claims, 13 Drawing Sheets

(56) References Cited

U.S. PATENT DOCUMENTS

| | | | |
|---|---|---|---|
| 10,713,356 B2* | 7/2020 | Meyers | G06F 21/6209 |
| 10,972,503 B1* | 4/2021 | Mohan | H04L 63/14 |
| 10,977,379 B1* | 4/2021 | Williams | G06F 21/604 |
| 11,057,428 B1* | 7/2021 | Sellers | G06F 16/27 |
| 11,128,656 B2* | 9/2021 | Xie | H04L 63/145 |
| 12,199,993 B2* | 1/2025 | Tav | H04L 63/145 |
| 2004/0049695 A1* | 3/2004 | Choi | H04L 63/1408 726/23 |
| 2005/0060582 A1* | 3/2005 | Choi | H04L 63/1441 709/224 |
| 2008/0016570 A1* | 1/2008 | Capalik | H04L 63/1416 726/23 |
| 2009/0158435 A1* | 6/2009 | Milliken | H04L 63/145 726/13 |
| 2010/0077483 A1* | 3/2010 | Stolfo | G06F 21/554 726/23 |
| 2012/0084866 A1* | 4/2012 | Stolfo | H04L 63/1416 726/25 |
| 2012/0317145 A1* | 12/2012 | Reghetti | G06F 21/6209 707/E17.005 |
| 2013/0227714 A1* | 8/2013 | Gula | H04L 63/1408 726/32 |
| 2013/0242758 A1* | 9/2013 | Vaidya | H04L 41/0686 370/248 |
| 2013/0242759 A1* | 9/2013 | Durrani | H04L 43/50 370/248 |
| 2014/0007246 A1* | 1/2014 | Nelson | H04L 63/0876 726/26 |
| 2014/0331274 A1* | 11/2014 | Bitton | H04L 63/0227 726/1 |
| 2016/0323316 A1* | 11/2016 | Kolton | H04L 63/1491 |
| 2017/0195364 A1* | 7/2017 | Levin | H04L 63/1491 |
| 2017/0214708 A1* | 7/2017 | Gukal | G06F 16/285 |
| 2017/0279854 A1* | 9/2017 | Ramalingam | H04L 63/1491 |
| 2017/0289190 A1* | 10/2017 | Kominar | H04L 63/1433 |
| 2018/0324147 A1* | 11/2018 | Li | H04L 63/1441 |
| 2019/0098027 A1* | 3/2019 | Wang | H04L 63/20 |
| 2019/0253453 A1* | 8/2019 | Vissamsetty | H04L 63/20 |
| 2020/0021994 A1* | 1/2020 | Ranjbar | H04L 63/1425 |
| 2020/0389430 A1* | 12/2020 | Di Mattia | H04L 63/105 |
| 2021/0011985 A1* | 1/2021 | Korotaev | G06F 21/126 |
| 2021/0185010 A1* | 6/2021 | Weisshaupt | H04L 63/1416 |
| 2023/0164182 A1* | 5/2023 | Kothari | H04L 63/1416 726/23 |
| 2023/0164184 A1* | 5/2023 | Kothari | H04L 63/1416 726/23 |
| 2023/0262073 A1* | 8/2023 | Sheu | H04L 63/1433 726/23 |
| 2024/0028717 A1* | 1/2024 | Meyers | H04L 63/1491 |
| 2024/0362467 A1* | 10/2024 | Deo | G06N 3/0475 |

* cited by examiner

LEVERAGING NETWORK SECURITY SCANNING TO OBTAIN ENHANCED INFORMATION REGARDING AN ATTACK CHAIN INVOLVING A DECOY FILE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to deception-based intrusion detection and prevention systems. In particular, embodiments of the present invention relate to leveraging of network security scanning (e.g., Data Leak Prevention (DLP) scanning) performed by network security devices protecting a private network to facilitate identification of an Internet Protocol (IP) address of a source of an attack chain involving access to and/or transmission of a decoy file including a traceable object.

Description of the Related Art

Network security systems, such as deception-based breach protection systems, also referred as deception-based intrusion detection and prevention systems, are used to detect intrusions or attacks on a network and protect the network from such instruction. In a typical deception-based breach protection system, decoys and lures are deployed with services, data and application to simulate real end points and servers. Decoys are normally deployed to attract an attacker to connect. The deception-based breach protection systems complement other breach protection strategies, designed to deceive, expose and eliminate attacks originating from either external or internal sources before any real damage occurs. These network security systems try to identify and locate an attacker when an attack is detected. Problems arise, however, when the attacker does not directly attack an endpoint or a server, but rather uses multiple intermediate connections or hosts to launch an attack.

SUMMARY

Systems and methods are described for identifying a source of an attack chain based on network security scanning events triggered by movement of a decoy file. A decoy file is stored on a deception host deployed by a deception-based intrusion detection system within a private network. The decoy file contains therein a traceable object that is detectable by network security scanning performed by multiple network security devices protecting the private network. Information regarding an attack chain associated with an access to the decoy file or a transmission of the decoy file through the one or more network security devices is received by the deception-based intrusion detection system from one or more network security devices of the multiple network security devices. The information is created responsive to detection of a security incident by the network security scanning performed by the one or more network security devices. Finally, an Internet Protocol (IP) address of a computer system that originated the attack chain is determined.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
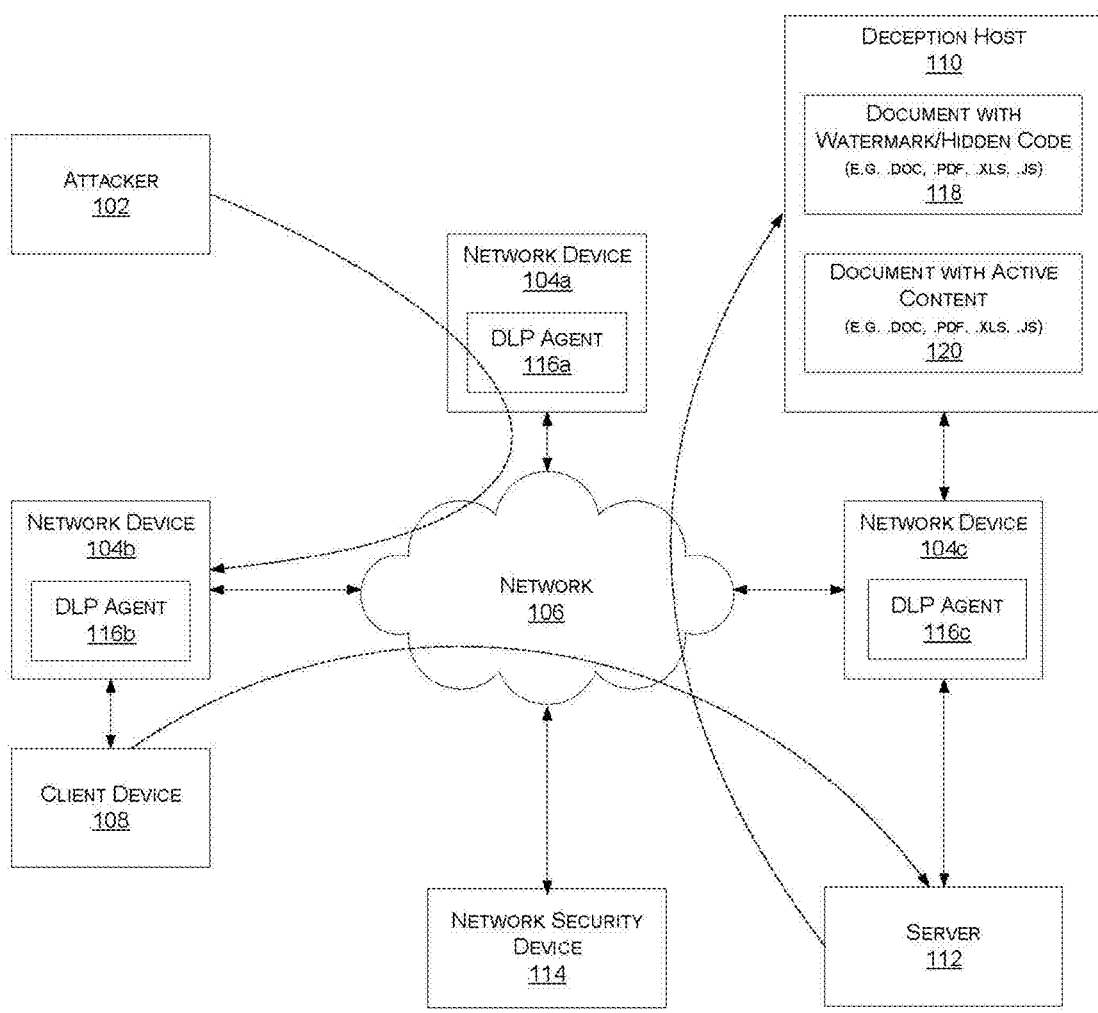
FIG. 1 conceptually illustrates an enterprise network in which attacker and compromised network resources are detected in accordance with an embodiment of the present disclosure.

Systems and methods are described for identifying a source of an attack chain based on network security scanning events triggered by movement of a decoy file. A network security device that performs deception-based intrusion detection and prevention deploys deception hosts within a private network and places decoy files with traceable objects (e.g., embedded watermarks, hidden codes and/or active content) to lure an attacker to connect with the deception hosts. Other network security devices, such as gateways, Intrusion Detection Systems (IDSs), Intrusion Prevention Systems (IPSs), firewalls, antivirus (AV) scanning, Application Control devices, and/or Unified Threat Management (UTM) appliances protecting the private network perform various network security scanning functionality (e.g., data leak prevention (DLP) scanning) that may be used to facilitate the detection of the transfer or movement of a decoy file having traceable objects embedded therein. For example, when a decoy file passes through a network security device, performance of one or more network security scans (e.g., a DLP scan) may detect the traceable object associated with the decoy file. In some embodiments, the detected traceable object may be matched against a database of traceable objects to identify a potential leak. The scanning agents (e.g., DLP agents) or the network security devices hosting the scanning agents can provide network logs, containing information regarding identified security incidents can be provided to the deception-based intrusion detection and prevention system, which can collect similar network logs from other network security scanning agents and analyze the network logs to identify an Internet Protocol (IP) address of a computer system that originated the attack chain and/or compromised network resources.

While various examples are illustrated herein with reference to DLP, the methodologies described herein are equally applicable to Intrusion Detection Systems (IDSs), Intrusion Prevention Systems (IPSs), antivirus (AV) scanning, Application Control and other similar current or future network security solutions that are able identify watermarks, hidden codes, hashes, bit sequences and/or other information used to identify a specific connection.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

As used herein a "network resource" generally refers to various forms of data, information, services, applications and/or hardware devices that may be accessed via a network (e.g., the Internet). Non-limiting examples of network resources include web applications, cloud-based services, network devices and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

The term "watermark" generally refers to information or a fingerprint embedded within a document. A watermark may contain information that is indicative of one or more of a source, origin, owner or author of the document (e.g., a company, group, division, end user or other entity or person) and a sensitivity level of the document or information contained therein (e.g., critical, high, medium, low). According to one embodiment, a watermark includes plain text (a visible watermark) or encoded information (an invisible watermark) containing a company identifier and a sensitivity level. In other embodiments, the watermark is a value (e.g., a hash value) that can be used to look up the associated company identifier and sensitivity level. Non-limiting examples of watermarking are described in U.S. Pat. No. 9,319,417, the disclosure of which is hereby incorporated by reference in its entirety for all purposes. Non-limiting examples of DLP scanning are described in U.S. Pat. Nos. 9,225,734 and 10,083,318, the disclosures of which are hereby incorporated by reference in their entirety for all purposes.

FIG. 1 conceptually illustrates an enterprise network in which attacker and compromised network resources are detected in accordance with an embodiment of the present disclosure. As shown in FIG. 1, a network security device 114 (e.g., a deception-based intrusion detection system, such as the FORTIDECEPTOR family of deception-based breach protection appliances available from Fortinet, Inc. of Sunnyvale, Calif.) can deploy deception host 110 in a private network, for example an enterprise network 106, and store decoy files containing traceable objects on the deception host 110. The network security device 114 may deploy several other deception hosts in the private network and store decoy files on these deception hosts. In an embodiment, the network security device 114 can create a virtual network resembling the private network and place the deception hosts, which may be in the form of Virtual Machines (VMs), to lure attackers. The network security device 114 may leverage existing security infrastructure to monitor movement of decoy files and detect attacker and other compromised network resources of the private network. The network security device 114 may receive information, in form of network logs, from network devices protecting the private network from different kind of network threats, when movement of a decoy file is detected. Network devices, such as network device 104a, network device 104b and network device 104c, may detect movement of decoy files and report such movements to the network security device 114.

In an embodiment, each of the network devices 104a-c may have a network security scanning agent (e.g., a DLP agent) configured to detect movement of decoy files and determine the presence of a traceable object embedded therein. Responsive to detection of a security incident (e.g., movement or transmission of a decoy file or access to active content within a decoy file), network devices 104a-c may send information, indicative of the security incident to the network security device 114. The network security device 114 may analyze such information received from multiple network devices 104a-c and determine a source of the attack chain. Using the information received from multiple network devices 104a-c, the network security device 114 may determine the identity of an attacker 102 and other network resources, such as client device 108, and server 112 involved in an attack. The network devices detecting movement of the decoy files may be some of the existing infrastructure involved in protecting the private network. For example, the network security devices may include network security devices, such as gateways, Intrusion Detection Systems (IDSs), Intrusion Prevention Systems (IPSs), firewalls, antivirus (AV) scanning, Application Control devices, and/or Unified Threat Management (UTM) appliances protecting the private network that perform various network security scanning functionality (e.g., data leak prevention (DLP) scanning) that may be used to facilitate the detection of the transfer or movement of a decoy file having traceable objects embedded therein.

An attacker 102 may find deception host 110, which may appear as a real network resource to the attacker 102, as an easy target and may initiate an attack and try to move or access files on the deception host 110. To avoid detection of its identity, the attacker 102 might use multiple intermediate network resources, such as client device 108 and server 108 to attack the deception host 110. As shown in FIG. 1, the attacker 102 may enter the private network through network device 104a, which may be a gateway, and routes its attack through client device 108 and server 112 to finally attack the deception host 110. The deception host 110 stores decoy files, for example document 118, which includes a watermark or a hidden code, and document 120, which includes active content. Non-limiting examples of decoy files include Word documents (e.g. .doc, .docx etc.), spreadsheets (e.g. .xls, .xlsx, .xml etc.), portable document format files (.pdf) , java script files (.js), image files, video files and other files to lure attackers. The decoy files contain traceable objects or may have associated traceable objects. These traceable objects may include watermarks, hidden codes, hashes, bit sequences or active content detectable by existing network security scanning implemented by network security devices protecting the private network.

The network devices 104a-c of the private network may employ different tools for detecting movement of decoy files. In an embodiment, each of network device 104a, network device 104b and network device 104c may have a network security scanning agent (e.g., DLP agent 116a, DLP agent 116b and DLP agent 116c, respectively) configured to detect security incidents, including movement of the decoy files. The network devices 104a-c may maintain logs, capturing movement of decoy file, and send the logs to the network security device 114. The DLP agents may discover the presence of the traceable objects to confirm movement of decoy files. For example, the DLP agents may detect the presence of a watermark or hidden code to confirm movement of decoy files. The DLP agents can also compare hash values of files being moved to determine whether the hash values match those of the decoy files. Similarly, the network devices 104a-c can also detect the movement of decoy files using bit sequence matching. One or more network devices of multiple network devices of the private network at which the movement of the decoy file is detected may report their respective logs to the network security device 114.

In an embodiment, when the attacker 102 copies the decoy files and tries to access active content embedded therein, the active content establishes a. direct connection between the device accessing the active content and the deception host 110. Deception host 110 or network device through which the attacker 102 establishes direct connection with the deception host 110, shares logs reflecting the direct connection to the deception host 110 by the attacker 102. The network security device 114 may receive logs from deception host 114 reflecting the direct connection and using the logs to discover the identity (e.g., the IP address) of the attacker 102. The network security device 114 may analyze the received logs from network devices and deception host and determine an attack chain to discover the identity of attacker and/or other compromised network resources.

Figure 2:
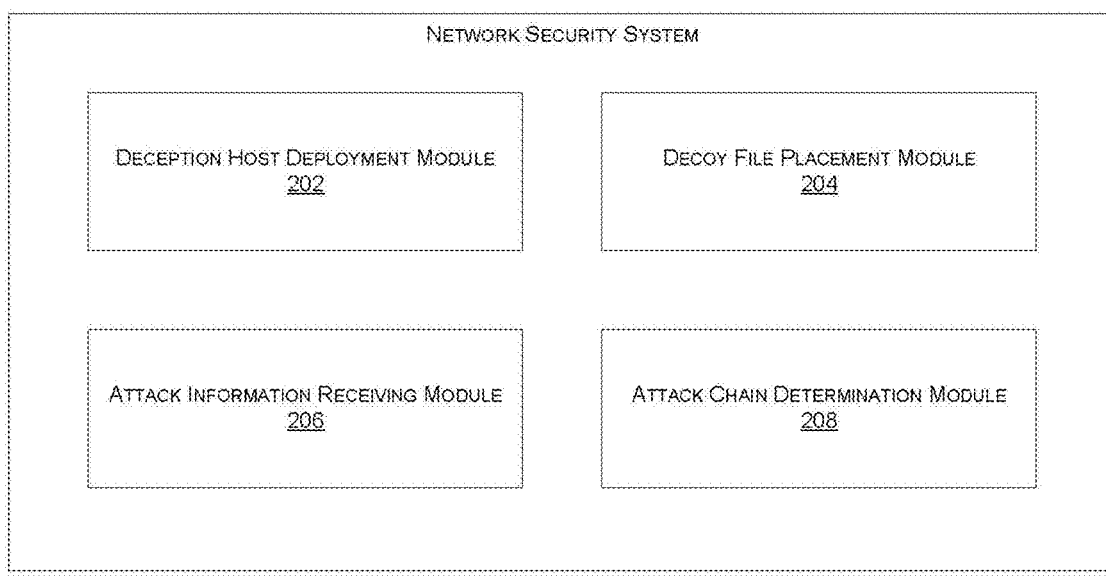
FIG. 2 illustrates functional modules of a network security system in accordance with an embodiment of the present disclosure.

FIG. 2 illustrates functional modules of a network security system in accordance with an embodiment of the present disclosure. The network security system (e.g., a deception-based intrusion detection system) may include a deception host deployment module 202 configured to deploy several deception hosts in a private network, a decoy file placement module 204 configured to store decoy files at the deception hosts, an attack information receiving module 206 configured to receive information associated with movement of any decoy file from one or more network devices of the private network, and an attack chain determination module 208 configured to determine attack chain based on analysis of the received information to discover identity of the attacker and compromised network resources. The decoy files are documents that contain traceable objects, which can be detected by one or more types of network security scanning techniques (e.g., AV scanning, IDS scanning, IPS scanning, DLP scanning, application control scanning, and the like) to identify a security incident, for example, in the form of movement or transfer of a decoy file through the network security devices.

In an embodiment, the deception host deployment module 202 deploys several decoy agents, which may be various virtual machines of different types that behave like real endpoints or servers in the private network. The deception host deployment module 202 may deploy a deception surface of real Windows, Linux, Virtual Private Network (VPN), and Supervisory Control and Data Acquisition (SCADA) VMs that are indistinguishable from real assets, e.g. production servers, to lure attackers into revealing themselves. The deception hosts may include services, applications, or users added to deception virtual machines to simulate real user environment. The deception host deployment module 202 may provide an interface to a network manager to create different deception virtual machines and place them at different segment of the private network. The deception host deployment module 202 may automatically place the deception hosts at right place in the private network or allow the network manager to specify location where the deception hosts needs to be placed. One or more deception hosts in the private network can be deployed, initiated and stopped through the users interface. The deception host deployment module 202 may allow configuration of different services, such as Secure Shell (SSH) service, Server Message Block (SMB) service, SAMBA, File Transfer Protocol (FTP) service, Remote Desktop Protocol (RDP) service and other services, at deception host to simulate as real end points. The module 202 deploys decoys with different OS types equipped with lures (e.g. SMB/SQL/SSH service) that appear indistinguishable from real IT and OT assets and are highly interactive. In an embodiment, the deception host deployment module 202 may also recommend suitable deception hosts and its appropriate placement in the private network based on historical knowledge of the attack and attack types for efficient tracing of attacks.

Once the deception hosts are deployed, the decoy file placement module 204 can place decoy files, which are documents with traceable object, on different deception hosts. The decoy files may include human readable files or machine readable files with traceable objects. In an embodiment, the traceable objects may be a watermark, a hidden code, a hash value of the respective file that it is associated with, a bit sequence of respective file that it is associated with, active content or any combination thereof. The decoy file placement module 204 places decoy files at the deception hosts or some real endpoints that acts as breadcrumbs and lures placed to deception hosts. The network security system can also place decoy files within the real endpoints and other IT assets on the network to maximize the deception. These decoy files can be used to influence attacker's lateral movements and activities. When an attacker try to access files and moved these files using any of the services, such as SSH service, SMB service, SAMBA, FTP service, RDP service and other services, hosted by the deception host, network devices of the private network can detect access, transfer or any movement of the decoy files.

Network security devices, such as gateways, Intrusion Detection Systems (IDSs), Intrusion Prevention Systems (IPSs), firewalls, antivirus (AV) scanning, Application Control devices, and/or Unified Threat Management (UTM) appliances protecting the private network, may detect movement of such decoy files and send information, indicative of decoy file movement through these network security devices, to the network security system 200, when an attacker connects with deception hosts and tries to move decoy files. When a decoy file with active content is read, it establishes a clear connection between the attacker and the network security device. In an embodiment, the active content can be embedded in the decoy files to establish the direct connection between a host accessing the decoy file and a known network resource, which can then share the information reflective direction connection between a host accessing the decoy files and the network resource. The host may be an attacker or a compromised network resource.

In an embodiment, the attack information receiving module 206 receives information, indicative of decoy file movement, from one or more network security devices. The attack information receiving module 206 can also receive information, indicative of a direction connection between a host accessing the decoy files and the network resource, from the known network resource. The attack information receiving module 206 may receive the information in almost real-time from the network devices, as soon as any movement of decoy file is detected by a network security device. The attack information receiving module 206 may initiate a request to different network security devices of the private network to share information associated with detected movement of decoy files. The request may be via a cooperative security fabric in which the network security devices participate. A non-limiting example of an approach for creating and making use a cooperative security fabric is described in U.S. Pat. No. 10,686,839, the disclosure of which is hereby incorporated by reference in its entirety for all purposes.

In an embodiment, the network security devices may be configured with network security scanning agents (e.g., DLP agents) that detect security incidents, including movement of decoy files. DLP agents may be configured to read traceable objects associated with file, and refer to a local database or connected database storing traceable objects information to determine movement of decoy files. The DLP agents can match the watermark present within a decoy file with a list of watermarks to confirm movement of decoy file initially deployed by the network security device. Similarly, the DLP agents can match the hidden code, hash values and bit sequence of a file being moved with pre-configured hidden codes, hash values and sequences of decoy filed deployed initially by the network security device. The network security device while placing the decoy files with traceable objects can update a database of traceable objects, which can be accessed by network devices to determiner movement of decoy files.

Network security devices store information responsive to detection of security incidents (e.g., decoy file movement) in the form of log files (e.g., security logs) and share the information to the attack information receiving module 206.

In an embodiment, the network security device configured with DLP agents can monitor the hacker's actions, such as incidents, events, and campaign by the attacker and report such incidents, events and campaign information to the network security system 200. The log files may represent a record of events occurring within the private network. Logs typically include log entries, each containing information relating to a specific event or security incident that has been observed by the network security device at issue. Security logs may include the sequence of a network or system intrusion event. As such, by analyzing a combination of multiple security logs produced by multiple network security devices distributed throughout a private network and/or security logs maintained by a Security Information and Event Management (STEM) device, information regarding the attack chain, the intrusion time, contaminated servers, and an attack pattern can be traced and analyzed via these log files. Non-limiting examples of information that might be included within a log entry relating to a security incident include a time stamp, source IP address, destination IP address, source port, destination port, protocol, all or a portion of the packet (e.g., header and/or payload) that triggered the detection, information regarding the type of security incident detected, etc.

On receipt of logs from the one or more network security devices, the attack chain detection module 208 can analyze the logs to determine an attack chain and further discover the identity or IP address of the attacker and/or compromised network resources. In an embodiment, the attack chain detection module 208 can be configured to discover one or more end point nodes and intermediate network devices associated with the attack chain. The attack chain detection module 208 can detect the attack chain and discover the Internet Protocol (IP) address of the attacker, IP addresses of the network resources, ports used during the attack, targeted network segment, date and time of the attack, type of attack and severity of the attack. The attack chain detection module 208 can analyze the logs and correlate the information to detect attack chain and discover identity of the attacker and compromised network resources. Severity level of the attack can be determined based on amount of data being transferred and number of compromised network resources. As one may appreciate different rules can be defined to determine severity levels.

The network security system 200 may generate reports containing identity of the attacker and compromised network resources to other network security devices take appropriate mitigation measures. The report may include time lined representation of different activities or events associated with the attack chain that may have taken place at different network devices or at different network resources. In an embodiment, the system 200 may provide an interactive interface to present information associated with the attack chain. The system 200 may also present simulated attack sequence based on the analysis of the logs.

In an embodiment, the system 200 discovers presence of attacker and compromised network resources associated with an attack chain. As on may appreciate, the system 200 usages existing infrastructure, such as DLP system, to detect movement of decoy files through network devices. The network security system 200 can track internal or external attacker by tracing the attack chain. The network security system 200 not only discovers the compromised network resources but also the identity of the attacker.

Figure 3:
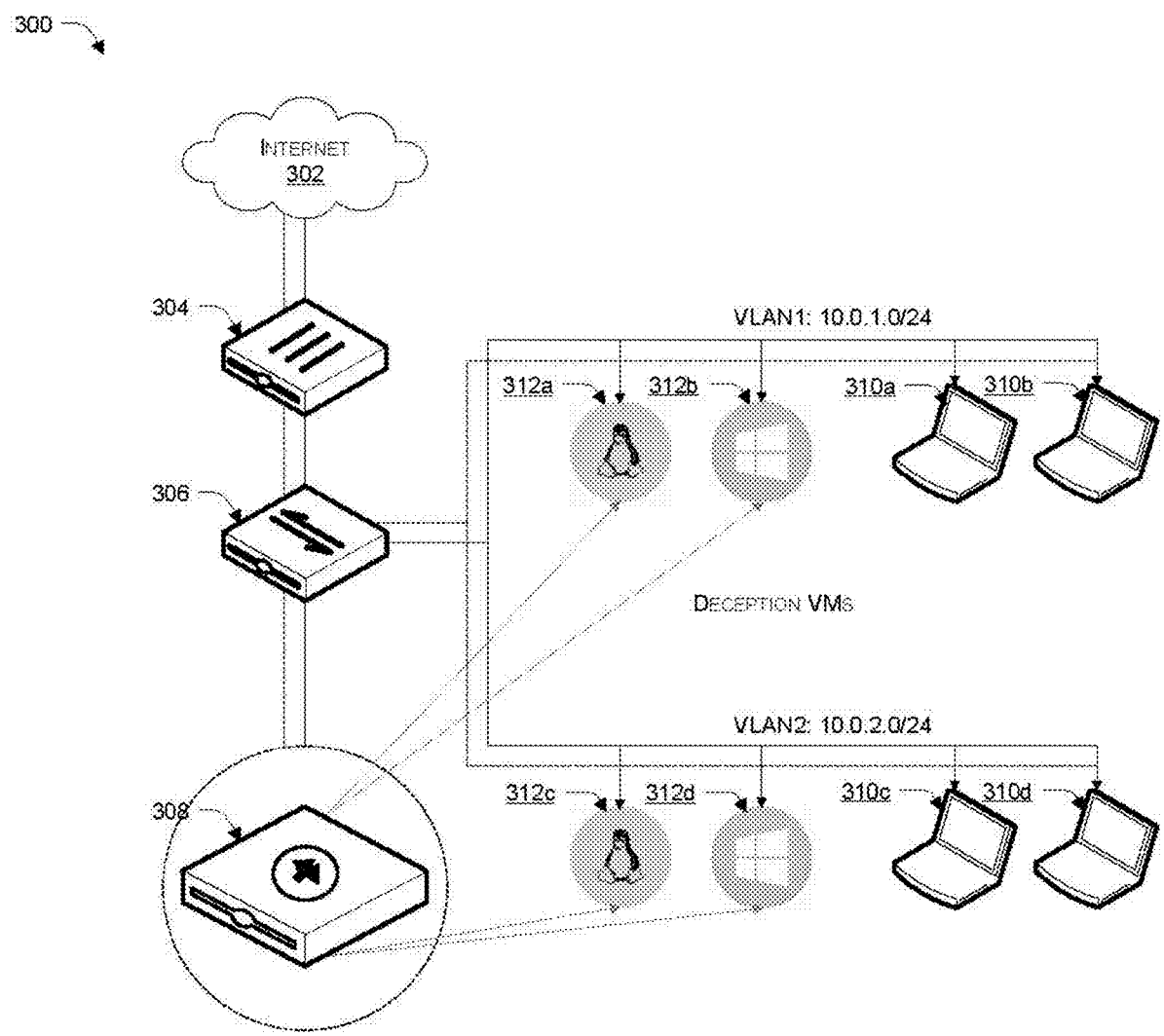
FIG. 3 illustrates an example deception platform for deploying deception hosts in a network in accordance with an embodiment of the present disclosure.

FIG. 3 illustrates an example deception platform 308 for deploying deception hosts in a network in accordance with an embodiment of the present disclosure. In an embodiment, functionalities of the deception host deployment module 202 and decoy placement module 204 can be performed by a dedicated device, such as a deception platform 308 shown in FIG. 3. The deception platform 308 (e.g., a deception-based intrusion detection system) can deploy several deception hosts, such as deception host 312a, deception host 312b, deception host 312c, and deception host 312d in a private network. In an embodiment, a gateway device 304 may connect the private network to the interne 302. The private network may have several network security devices, e.g. firewall 306, providing security to end point 310a, end point 310b, end point 310c and end point 310d, collectively referred as end point 310a-d. The deception platform 308 can deploy deception hosts based on Linux, window or any other supported platform. For example, the deception platform 308 deploys Linux based deception host 312a and deception host 312c and deploys Windows based deception host 312b and deception host 312d in the network. The deception hosts 312a-d simulate behavior similar to the real end-points 310a-d. In an embodiment, the deception platform 308 can create a virtual network and place deception hosts in the virtual network. The deception platform 308 can further store decoy files on deception hosts 312a-d to lure attackers.

Figure 4A:
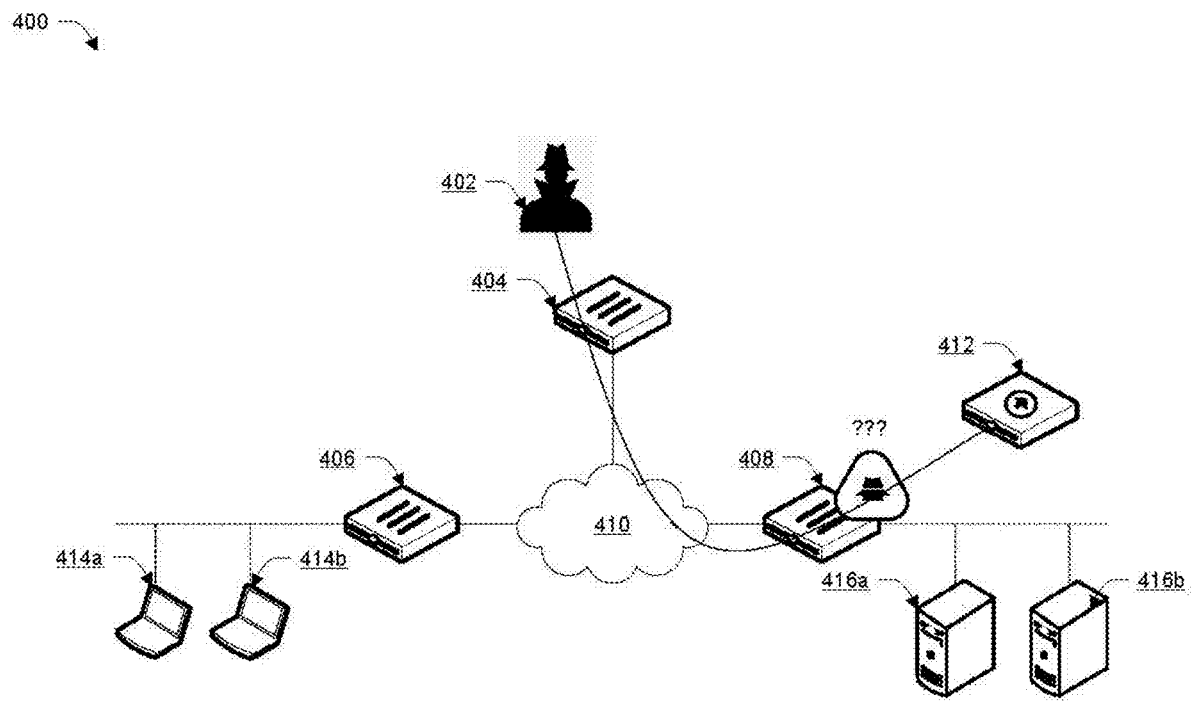
FIG. 4A illustrates an example attack on a deception host that can be detected and prevented in accordance with an embodiment of the present disclosure.

FIG. 4A illustrates an example attack on a deception host that can be detected and prevented in accordance with an embodiment of the present disclosure. An attacker 402 may find a vulnerable end point, which is actually a deception host 412, and try to reach the deception host 412 through gateway 404 and firewall 408 of a private network 410. The deception host 412 may store several decoy files each containing a traceable object which is detectable by one or more types of network security scanning (e.g., Data Leak Prevention (DLP) scanning) performed by network security devices protecting the private network. As the attacker 402 connects with the deception host 412 and tries to access files, which are actually decoy files containing traceable objects, DLP agents, for example, operable within the network security devices, such as firewall 408 and gateway 404 detect movement of decoy files and report the information, reflecting movement of decoy files, to a deception-based intrusion detection system. Network security devices, such as firewall 408 and gateway 404 may perform DLP scanning to detect movement of decoy files with traceable objects and share information regarding an attack chain associated with an access to the decoy file or a transmission of the decoy file through the network devices. The deception-based intrusion detection system may receive the information which is created by network security devices responsive to detection of security incidents (e.g., DLP events detected by the DLP scanning performed by the network security devices). The deception-based intrusion detection system analyzes the received information and determines information associated with an attack chain, for example, including an IP address associated with a computer system that originated the attack chain or other information that may be used to identify the attacker 402.

In an embodiment, even if the decoy files are not moved from the deception host 412 and only read at the deception host 412, the network security system can still detect the attack as the attacker try to read a decoy file containing active content. As soon as the attacker 402 reads or accesses active content, a direct connection is established between the attacker 402 and a preconfigured network resource. The preconfigured network resource, when receive a direct connection request reports the incident to the network security device. The network security device can analyze the active connection information to determine identity of the attacker 402.

Figure 4B:
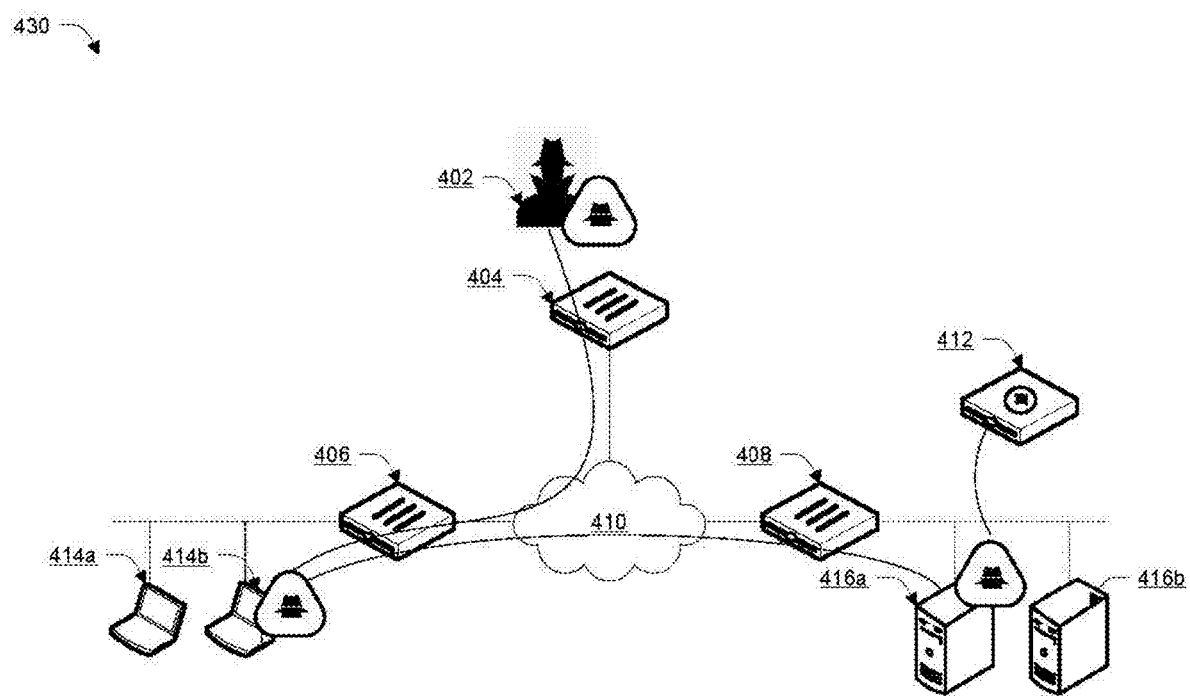
FIG. 4B illustrates an example attack at a deception host routed through trusted network resources that can be detected and prevented in accordance with an embodiment of the present disclosure.

FIG. 4B illustrates an example attack at a deception host routed through trusted network resources that can be detected and prevented in accordance with an embodiment of the present disclosure. An attacker 402 may not always attack the deception host 412 directly, but may instead use a series of network devices. A variety of network resources, such as end point 414a, end point 414b, server 416a and server 416b may be used by attacker 402 to indirectly reach the deception host 412. As shown in FIG. 4B, the attacker 402 connects through end point 414b, and server 416a to reach the deception host 412. As the attacker 402 moves files from deception host 412 through server 416a and end point 414b, network devices, such as gateway 404, firewall 406 and firewall 408 performs DLP scanning to detect movement of decoy files and send information, indicative of detected decoy file movement, to network security device. The network security device receives the information from gateway 404, firewall 406 and firewall 408 and analyze the information to detect attack chain. The network security device may discover identity of the attacker 402 and compromised network resources endpoint 414b and server 116a by analyzing the information.

Figure 4C:
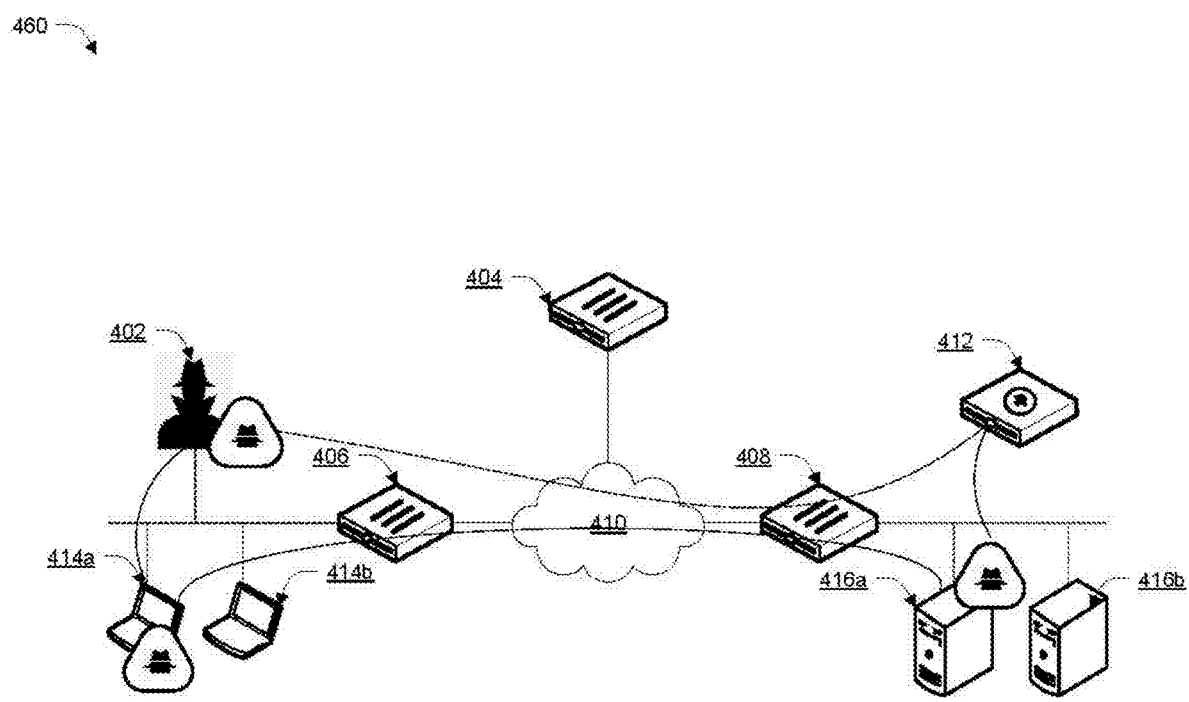
FIG. 4C illustrate an example usage of active content of a decoy file to establish direct connection with an attacker in accordance with an embodiment of the present disclosure.

FIG. 4C illustrate an example usage of active content of a compromised document to establish direct connection with an attacker in accordance with an embodiment of the present disclosure. As shown in FIG. 4C, when the attacker 402 try to read decoy file containing active content, a direct and clear connection is established between the attacker 402 and deception host 412 and hence identity of attacker 402 is discovered easily. The attacker 402 establishes clean connection with the deception host 412 when the active content embedded on the decoy file read or used. The active content includes a hyperlink, embedded media, JavaScript, or a macro or a combination thereof.

Figure 5:
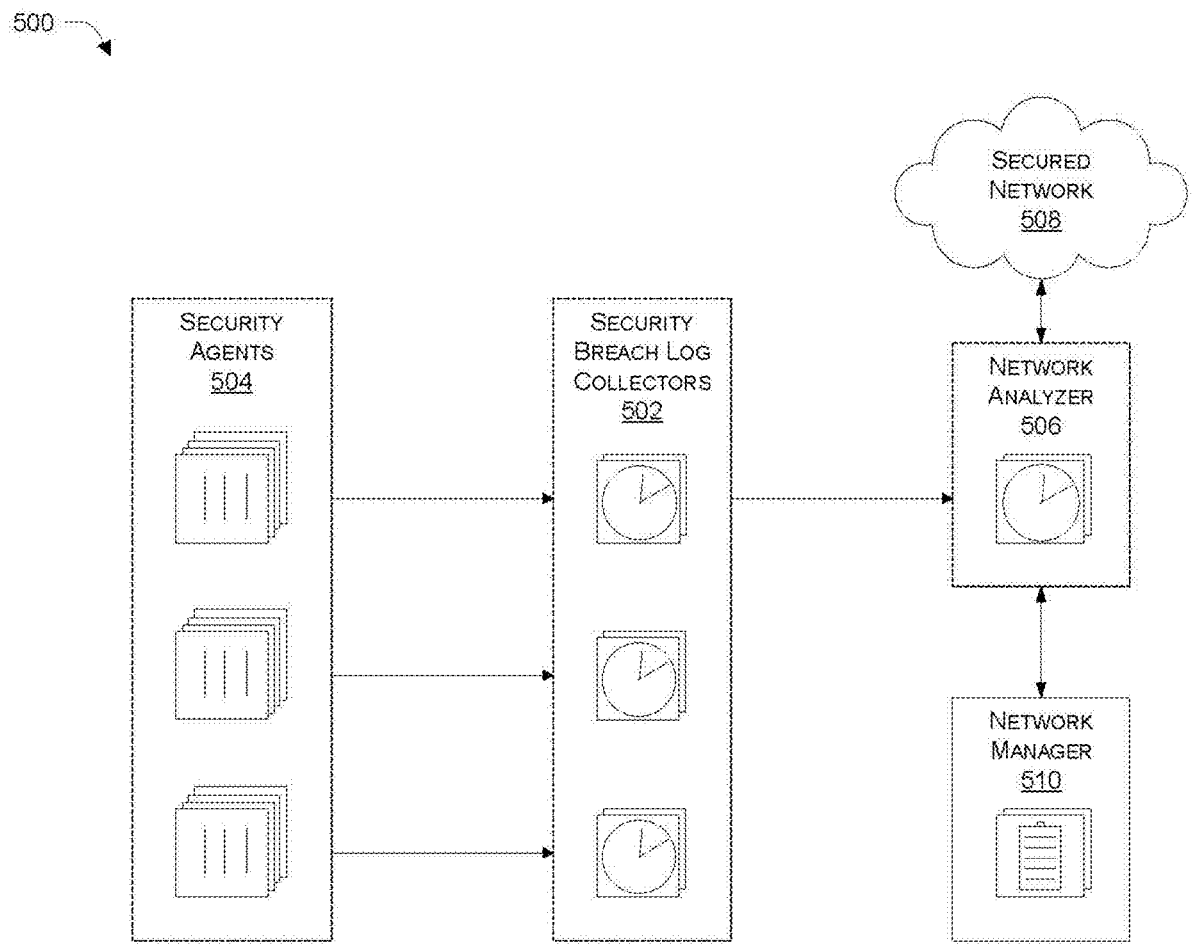
FIG. 5 is an example block diagram illustrating flow of security breach event log information in accordance with an embodiment of the present disclosure.

FIG. 5 is an example block diagram illustrating flow of security breach event log information in accordance with an embodiment of the present disclosure. In an embodiment, different functionalities of the network security device 114 or network security system 200 may be implemented on a single computing device or distributed on dedicated devices for implementing specific functions. In an embodiment, security agents 504, which may include a DLP system, an IDS, an IPS, an antivirus, an application control system, and a malware detection system can be configured at network devices to detect network attack and store information regarding security incidents, indicative of the network attack, in the form of secuirty logs. The security agents 504 can be configured with network security devices (e.g., gateways, Intrusion Detection Systems (IDSs), Intrusion Prevention Systems (IPSs), firewalls, antivirus (AV) scanning devices, Application Control devices, and/or Unified Threat Management (UTM) appliances protecting the private network, to detect an attack, maintain security logs and share the security logs with security breach log collectors 502. The security breach collectors 502 may be software module that can be deployed at a network security device. The breach collectors 502 forward the security logs to a network analyzer 506, which can analyze the network logs to detect an attack chain and discover identity of attacker and other compromised resources.

In an embodiment, the network analyzer 506 may create a trace report containing an IP address of a computer system used by the attacker and one or more compromised network resources and share the trace report with network manager 510 and other devices of the secure network 508 for taking mitigation measure and preventive measures to protection the network from future attacks.

Figure 6A:
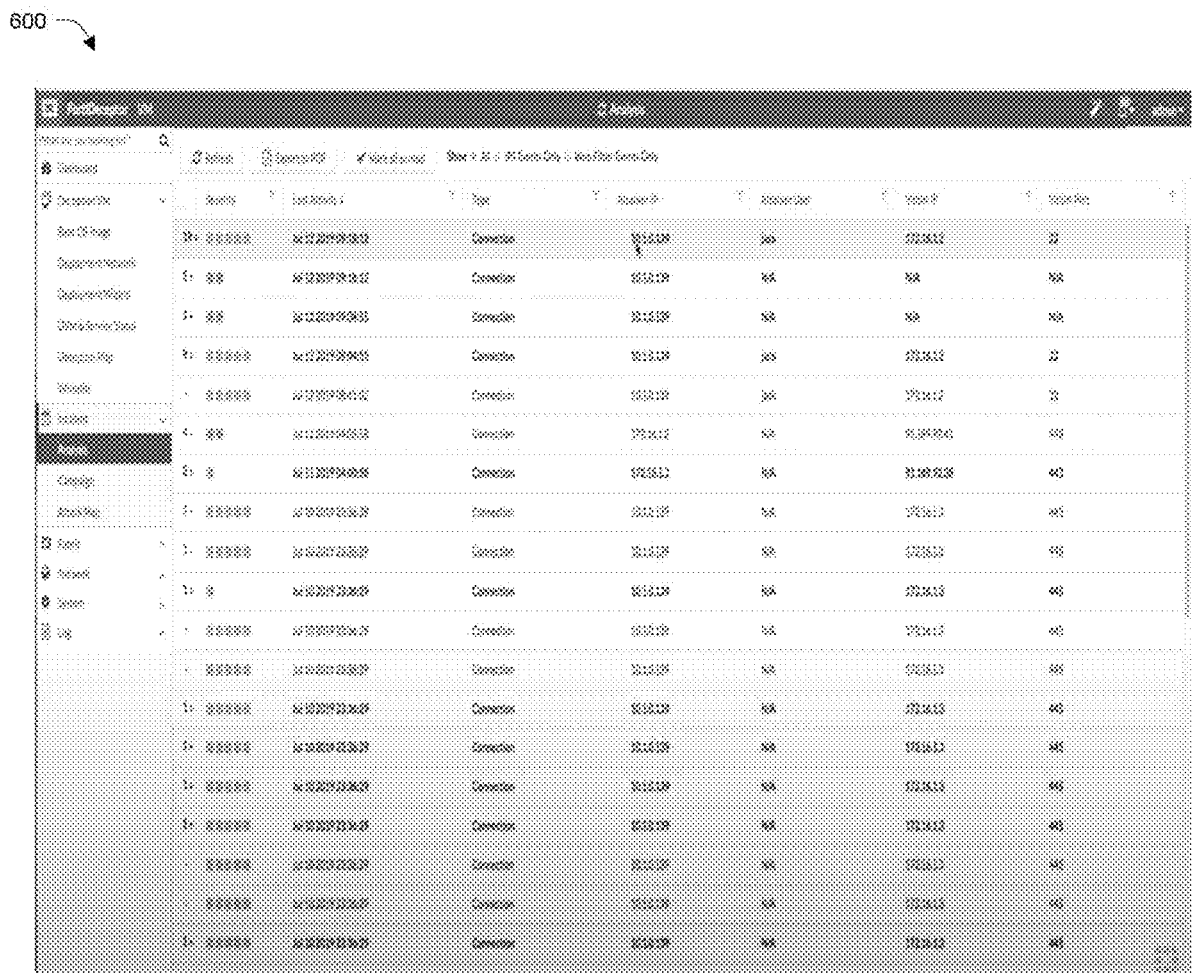
FIG. 6A illustrates example list of identified attacks in accordance with an embodiment of the present disclosure.

FIG. 6A illustrates example list of observed security incidents in accordance with an embodiment of the present disclosure. In an embodiment, the network security device may facilitate a user interface through which information associated with detected attacks can be presented in more detail. As shown in FIG. 6A, the network security device can present a list of all the attacks detected and provide various information, including, but not limited to, an indication of a severity level of the detected threat, last activity performed by the attacker, type of attack, attacker's IP, attacker's name, victim's IP, and victim's port information. The network security device can derive part or all of the information by analyzing security logs received from network security devices. In one embodiment, the attack chain and all the activities performed by the attacker within the network can be traced and displayed in more granular details.

Figure 6B:
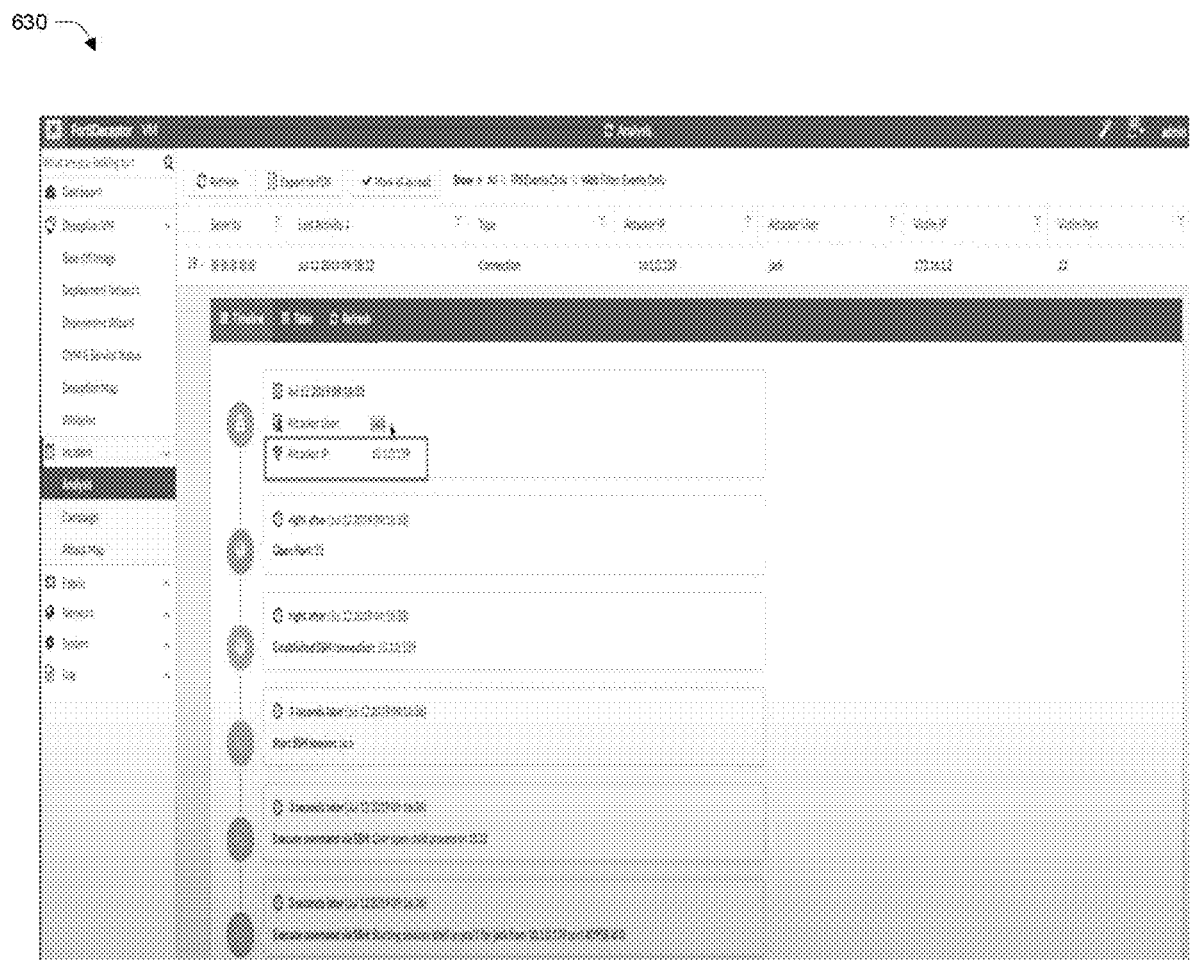
FIG. 6B illustrates example identify information of an attacker detected in accordance with an embodiment of the present disclosure.
Figure 6C:
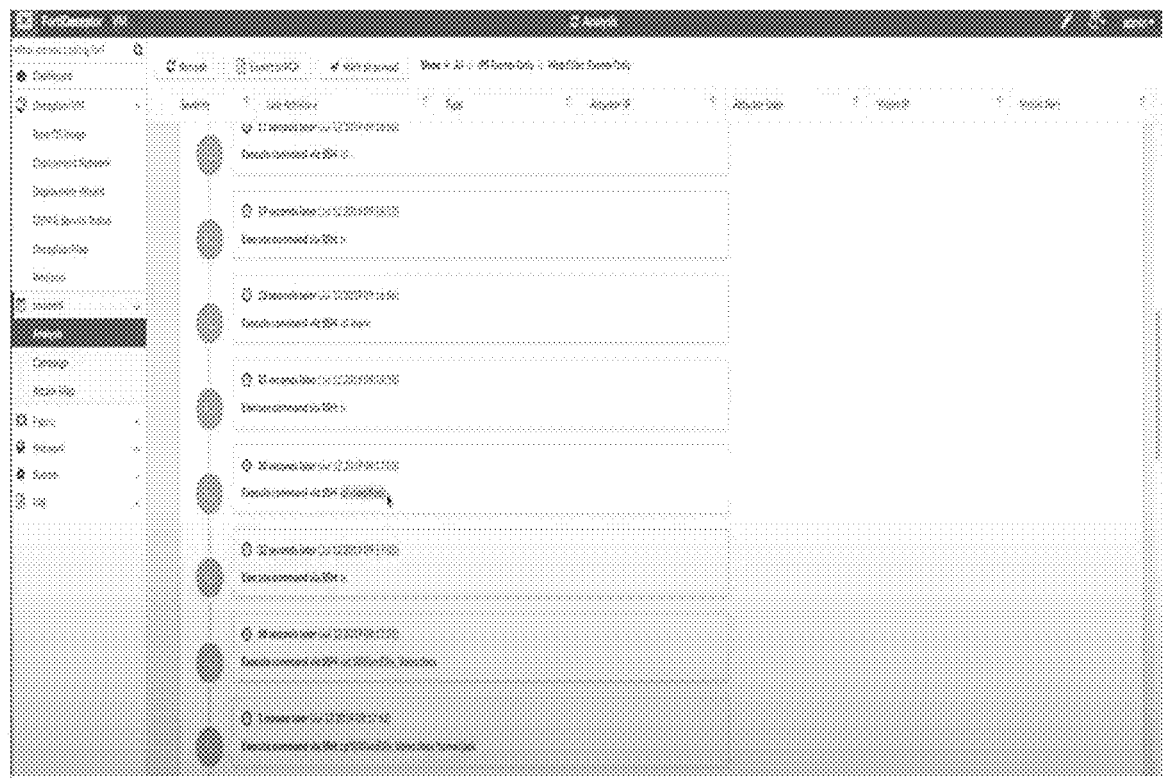
FIG. 6C illustrates activities performed by an attacker on a decoy host and on one or more compromised network resources in accordance with an embodiment of the present disclosure.

FIG. 6B illustrates example identify information of an attacker detected in accordance with an embodiment of the present disclosure. As shown in FIG. 6B, the network security device may provide identity of the attacker and information about compromised network resources. FIG. 6C illustrates activities performed by an attacker on a decoy host and on one or more compromised network resources in accordance with an embodiment of the present disclosure. The network security device can present information associated with attack chain to show interfaces or ports used by the attacker, services of different network resources used by the attacker, trace of decoy file movement, commands executed at different compromised network resources, all the commands issued by the attacker and other such details.

Figure 7:
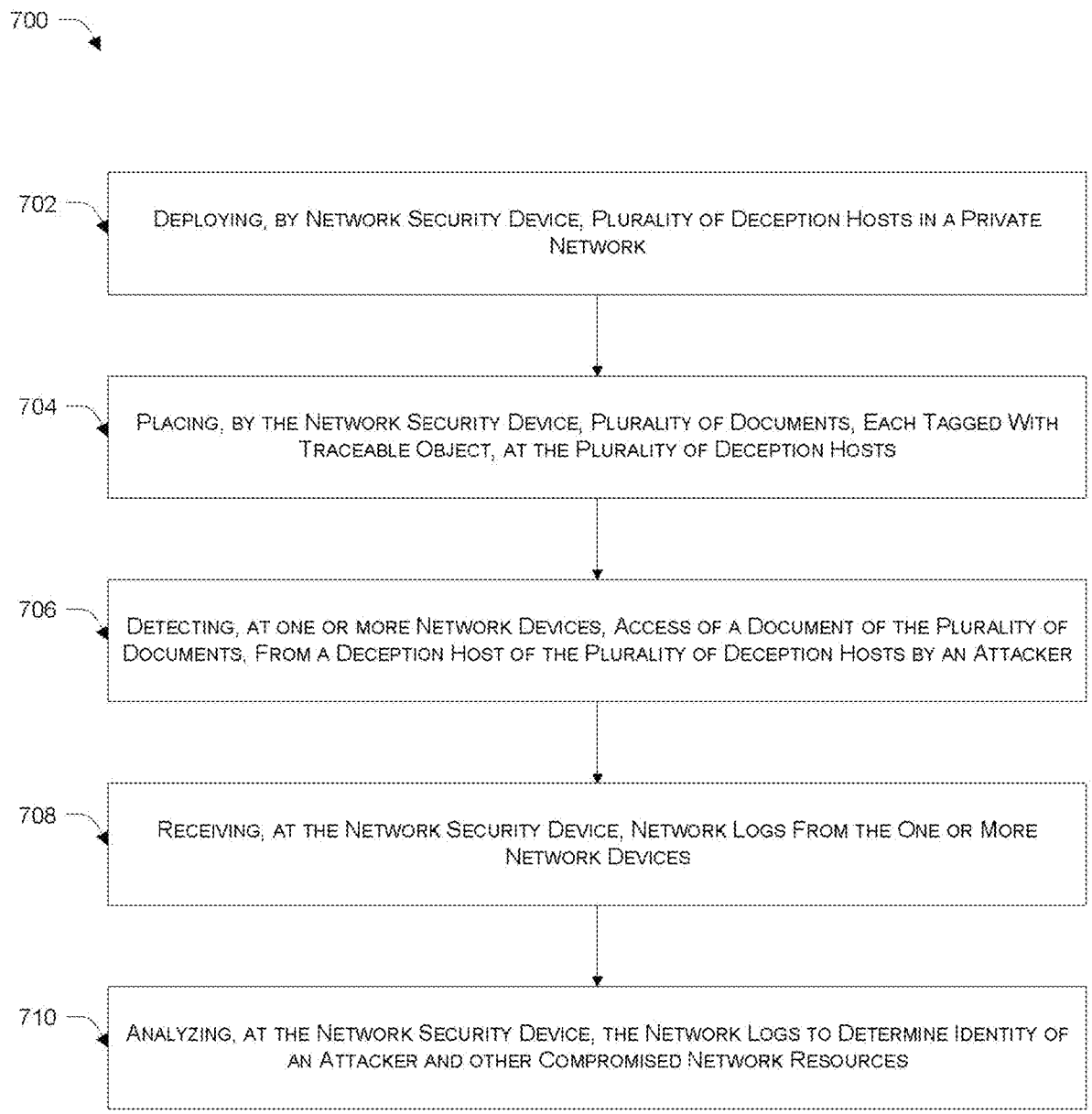
FIG. 7 is a flow diagram illustrating detection of an attacker and one or more compromised network resources in accordance with an embodiment of the present disclosure.

FIG. 7 is a flow diagram illustrating detection of an attacker and one or more compromised network resources in accordance with an embodiment of the present disclosure. A method 700 includes steps of deploying, by network security device, plurality of deception hosts in a private network as shown at block 702, and placing, by the network security device, plurality of documents, each tagged with traceable object at the plurality of deception hosts as shown at step 704. The documents each tagged with traceable object are also referred as decoy files. The method 700 further include steps of detecting, at one or more network devices, access of a document of the plurality of documents, from a deception host of the plurality of deception hosts by an attacker as shown at block 706, receiving, at the network security device, network logs from the one or more network devices as shown at block 708 and analyzing, at the network security device, the network logs to determine identity of an attacker and other compromised network resources as shown at block 710.

A suitable user interface can be provided for creating, maintaining and managing deception hosts. The network security device can deploy different types of virtual machines, for example, window based or Linux based VMs. The network security device allows deployment of VMs in the private network. The network security device can enable and disable different services, such as SSH, SAMBA, SMB, and RDP running on deception host. When an attacker gains unauthorized access to the deception hosts, their movements can be monitored to understand behavior and activity of the attacker. On detection of an attack or attack chain, the network security device can generate a report listing identity of the attacker and compromised network resources. The report may include severity level of attack, last activity done by the attacker, type of event, attacker's IP mask, attacker's name, victim's IP, start time of the attack, location of the attacker, attacker's type (e.g. unknown, connection, interaction or reconnaissance etc.), victim's port and other such details related to the attack chain.

Although the DLP agents have been used in different embodiments to detect movement of decoy files through network devices, other security tools can be configured to monitor movement of decoy files and identity presence of traceable objects as the files moves through the private network.

The Network devices configured with DLP agents to detect movement of decoy files may be network security devices, such as firewall, gateway, router, network manager, IDS, IPS, malware system, and antivirus system.

Figure 8:
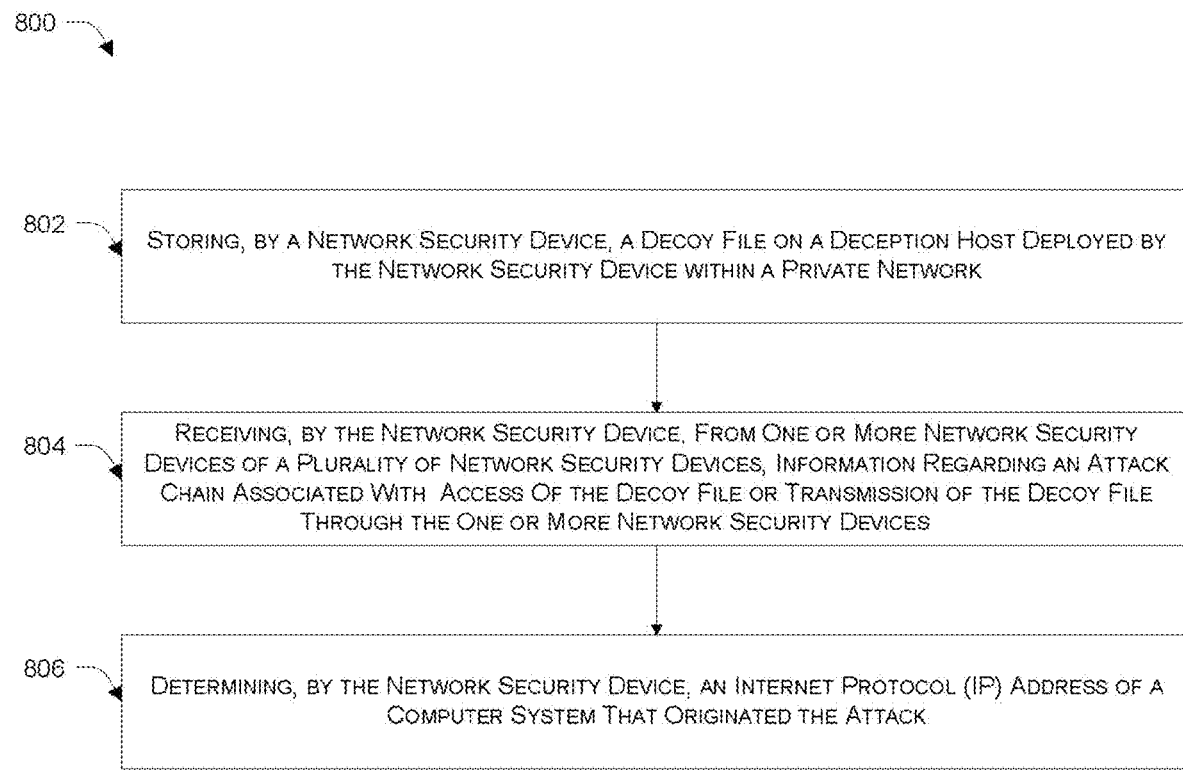
FIG. 8 is a flow diagram illustrating detection of an attacker in accordance with an embodiment of the present disclosure.

FIG. 8 is a flow diagram illustrating detection of an attack chain in accordance with an embodiment of the present disclosure. As shown in FIG. 8, a method 800 may include steps of storing, by a network security device, a decoy file on a deception host deployed by the network security device within a private network as shown at block 802, receiving, by the network security device, from one or more network security devices of a plurality of network security devices, information regarding an attack chain associated with an access to the decoy file or a transmission of the decoy file through the one or more network security devices, as shown at block 804, and determining, by the network security device, an Internet Protocol (IP) address of a computer system that originated the attack chain as shown at step 806.

In an embodiment, the decoy file contains a traceable object that is detectable by Data Leak Prevention (DLP) scanning performed by the plurality of network security devices protecting the private network. In an embodiment, the network security device receives the information that may have been created responsive to detection of a DLP event by the DLP scanning performed by the one or more network security devices.

In an embodiment, the network security device received information regarding an attack chain, from one or more network security devices of the plurality of network security devices, responsive to a request by the network security device. In an alternative embodiment, the network security device may receive information regarding the attack chain from the other network security devices using appropriate auto sync protocol. The information is shared to network security device from other network security devices via a cooperative security fabric involving the plurality of network security devices. The information regarding the attack chain is received in a form of logs maintained by the network security devices.

Depending upon the particular implementation, the various process and decision blocks described above may be performed by hardware components, embodied in machine-executable instructions, which may be used to cause a processing resource (e.g., a general-purpose or special-purpose processor) programmed with the instructions to perform the steps, or the steps may be performed by a combination of hardware, software, firmware and/or involvement of human participation/interaction.

Figure 9:
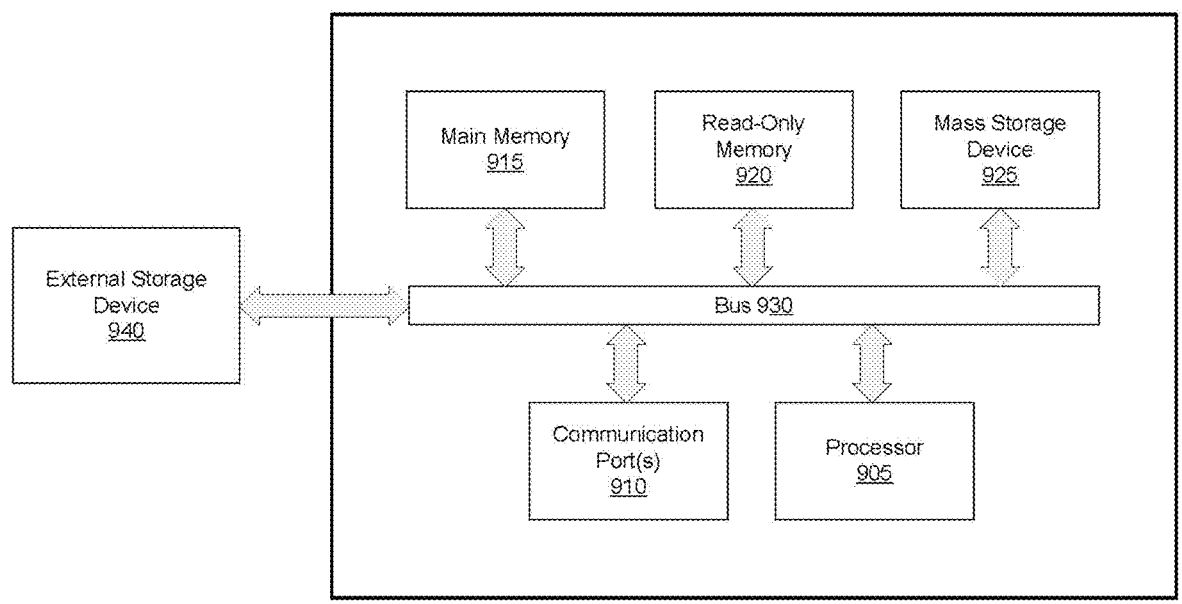
FIG. 9 illustrates an exemplary computer system in which or with which embodiments of the present invention may be utilized.

FIG. 9 illustrates an exemplary computer system in which or with which embodiments of the present invention may be utilized. As shown in FIG. 9, computer system includes an external storage device 910, a bus 920, a main memory 930, a read only memory 940, a mass storage device 950, a communication port 960, and a processing resource (e.g., processor 970).

Those skilled in the art will appreciate that computer system 900 may include more than one processor 970 and communication ports 960. Examples of processor 970 include, but are not limited to, an Intel® Itanium® or Itanium 2 processor(s), or AMD® Opteron® or Athlon MP® processor(s), Motorola® lines of processors, FortiSO-CTM system on a chip processors or other future processors. Processor 970 may include various modules associated with embodiments of the present invention.

Communication port 960 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 930 can be Random Access Memory (RAM), or any other dynamic storage device commonly known in the art. Read only memory 740 can be any static storage device(s) e.g., but not limited to, a Programmable Read Only Memory (PROM) chips for storing static information e.g. start-up or BIOS instructions for processor 770.

Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 970 to software system.

Optionally, operator and administrative interfaces, e.g. a display, keyboard, and a cursor control device, may also be coupled to bus 920 to support direct operator interaction with computer system. Other operator and administrative interfaces can be provided through network connections connected through communication port 960. External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A computer-implemented method, comprising:
   storing, by a processing resource of a deception-based intrusion detection system, a decoy file on a deception host deployed by a network security device within a private network, wherein the decoy file contains therein a traceable object that is detectable by network security scanning performed by a plurality of network security devices protecting the private network;
   receiving, by the processing resource, from two or more network security devices of the plurality of network security devices, information regarding an attack chain associated with an access to the decoy file or a transmission of the decoy file through the two or more network security devices, wherein the information is created responsive to detection of a security incident by the network security scanning performed by the two or more network security devices, wherein a direct connection is made with a computer system that originated the attack chain; and correlating information between at least a first network security device and a second network security device of the two or more network security devices to determine, by the processing resource, an Internet Protocol (IP) address of the computer system that originated the attack chain from the direct connection made by the two or more network security devices.

2. The method of claim 1, wherein the network security scanning comprises Data Leak Prevention (DLP) scanning.

3. The method of claim 2, wherein the traceable object comprises a DLP watermark.

4. The method of claim 1, wherein said receiving, by the processing resource, from the two or more network security devices of the plurality of network security devices, information regarding the attack chain is responsive to a request by the deception-based intrusion detection system.

5. The method of claim 4, wherein the request by the deception-based intrusion detection system is via a cooperative security fabric involving the plurality of network security devices.

6. The method of claim 4, wherein the information regarding the attack chain is received in a form of logs maintained by the two or more network security devices.

7. The method of claim 1, wherein the traceable object comprises active content, which when activated transmits a hidden code via an active connection.

8. The method of claim 7, wherein the active content is a hyperlink, embedded media, JavaScript, or a macro.

9. A deception-based intrusion detection system comprising:
    a processing resource; and
    a non-transitory computer-readable medium, coupled to the processing resource, having stored therein instructions that when executed by the processing resource cause the processing resource to:
        store a decoy file on a deception host deployed by the deception-based intrusion detection system within a private network, wherein the decoy file contains therein a traceable object that is detectable by network security scanning performed by a plurality of network security devices protecting the private network;
        receive from two or more network security devices of the plurality of network security devices information regarding an attack chain associated with an access to the decoy file or a transmission of the decoy file through the two or more network security devices, wherein the information is created responsive to detection of a security incident by the network security scanning performed by the two or more network security devices, wherein a direct connection is made with a computer system that originated the attack chain; and
        correlate information between at least a first network security device and a second network security device of the two or more network security devices to determine an Internet Protocol (IP) address of the computer system that originated the attack chain from the direct connection made by the two or more network security devices.

10. The deception-based intrusion detection system of claim 9, wherein the network security scanning comprises Data Leak Prevention (DLP) scanning.

11. The deception-based intrusion detection system of claim 10, wherein the traceable object comprises a DLP watermark.

12. The deception-based intrusion detection system of claim 9, wherein the information regarding the attack chain is received responsive to a request by the deception-based intrusion detection system.

13. The deception-based intrusion detection system of claim 12, wherein the request by the deception-based intrusion detection system is via a cooperative security fabric involving the plurality of network security devices.

14. The deception-based intrusion detection system of claim 12, wherein the information regarding the attack chain is received in a form of logs maintained by the two or more network security devices.

15. The deception-based intrusion detection system of claim 9, wherein the traceable object comprises active content, which when activated transmits a hidden code via an active connection.

16. The deception-based intrusion detection system of claim 15, wherein the active content comprises at least one of a hyperlink, embedded media, JavaScript, or a macro.

17. A non-transitory computer-readable storage medium embodying a set of instructions, which when executed by a processing resource of a deception-based intrusion detection system, causes the processing resource to:
    store a decoy file on a deception host deployed by the deception-based intrusion detection system within a private network, wherein the decoy file contains therein a traceable object that is detectable by network security scanning performed by a plurality of network security devices protecting the private network;
    receive from two or more network security devices of the plurality of network security devices information regarding an attack chain associated with an access to the decoy file or a transmission of the decoy file through the two or more network security devices, wherein the information is created responsive to detection of a security incident by the network security scanning performed by the two or more network security devices, wherein a direct connection is made with a computer system that originated the attack chain; and
    correlate information between at least a first network security device and a second network security device of the two or more network security devices to determine an Internet Protocol (IP) address of the computer system that originated the attack chain from the direct connection made by the two or more network security devices.

18. The non-transitory computer-readable storage medium of claim 17, wherein the network security scanning comprises Data Leak Prevention (DLP) scanning.

19. The non-transitory computer-readable storage medium of claim 18, wherein the traceable object comprises a DLP watermark.

20. The non-transitory computer-readable storage medium of claim 17, wherein the information regarding the attack chain is received in a form of logs maintained by the two or more network security devices.

* * * * *